May 31, 1927.
H. K. WHEELOCK
VULCANIZING APPARATUS
Filed Aug. 27, 1926
1,630,457
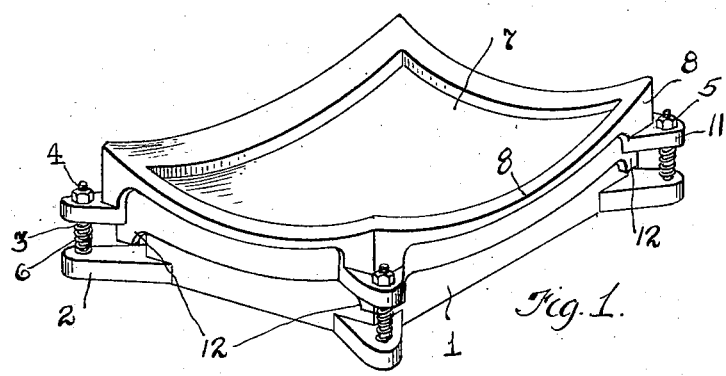
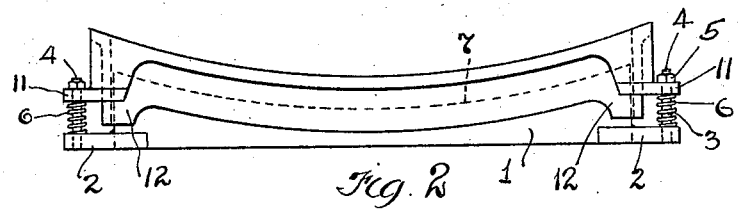
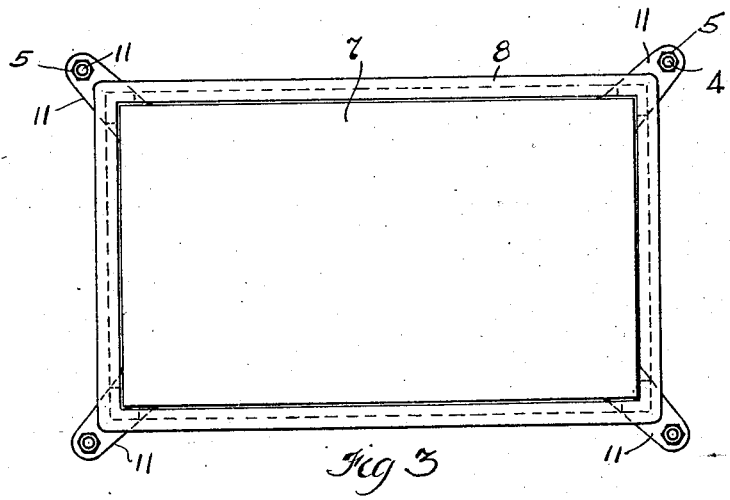
INVENTOR.
Herbert K. Wheelock.
BY
Fay, Oberlin & Fay
ATTORNEYS.

Patented May 31, 1927.

1,630,457

UNITED STATES PATENT OFFICE.

HERBERT K. WHEELOCK, OF AKRON, OHIO.

VULCANIZING APPARATUS.

Application filed August 27, 1926. Serial No. 131,908.

This invention as indicated relates to a vulcanizing apparatus. More particularly it relates to a vulcanizing device for curing or vulcanizing outside repairs of tire casings and the like. The apparatus in the form illustrated in the drawings comprises a plate adapted to contact with the thread portion of a tire casing and provided with a retractable marginal frame which normally projects a slight distance above the tread plate proper and permits a layer of dry soapstone, or similar material, to be placed upon the upper surface of the tread plate so that when a tire of non-skid design is clamped on it, the soapstone or other material enters into the spaces between the projecting portions of the tread forming a substantial support therefor and thus preserving the design.

Heretofore in curing tire casings, it has been the custom to ignore the design and form a patch which would be substantially smooth and not conform to the tread design, or to attempt to fill the space about the tread with soapstone or similar material by manual means, which method was open to objection as requiring unusual skill to accomplish any desirable result.

The principal object of the present invention is to obviate the difficulties referred to and to provide a tread plate which is adaptable for use in curing tire casings having any particular form of design and causing such repair to cure uniformly and present substantially the standard design of the tread over the repaired section. This is accomplished by seating the spot to be cured upon the soapstone layer over the tread plate, the soapstone, as stated, entering into the spaces between the projecting portions of the design, forming a substantial support therefor, and transmitting the heat uniformly to the side walls of such projecting portions. The frame about the tread plate serves to confine the soapstone to the central area above the plate.

The invention is of particular importance because of the high price of crude rubber and the desirability of conserving rubber in every reasonable manner. To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a perspective view showing an apparatus embodying the principle of my invention; Fig. 2 is a side elevation of the apparatus shown in Fig. 1; and Fig. 3 is a top plan view of the apparatus shown in Fig. 1.

As is clearly shown in the drawing, the apparatus comprises a base plate 1 of substantially square outline having diagonal members or extensions 2 at each of the corners upon which vertical studs 3 are mounted, said studs projecting upwardly and having screw-threaded upper ends, 4 adapted to be engaged by nuts 5. Over the body portions of said studs, coiled springs 6 are engaged.

The base plate preferably has formed integrally therewith an upward extension which forms the vulcanizing or tread plate 7. The vulcanizing or tread plate, as is clearly illustrated in the drawing is of standard form and comprises a concave plate corresponding in contour to the outer surface of a tire casing. The tread plate may project from the central portion of the base plate, leaving a margin about its sides or may, as shown, be of uniform outline with said base plate. A frame 8 of a size to fit over the upstanding tread plate and having a curvature about its upper margin corresponding thereto, is adapted to be mounted in slidable engagement with the tread plate. The frame, as is clearly illustrated in the drawing, is provided with projecting ears 11 extending diagonally over the respective corners of the frame and apertured so as to engage over the respective studs on the extensions of the base plate and rest against the springs mounted on said studs. Immediately beneath the respective corners of the frame projecting lugs 12 are provided which limit the downward movement of the frame to a point at which the frame contour will conform to the tread plate contour.

By the proper adjustment of the nuts, the amount of extension of the tread frame above the tread plate may be accurately adjusted. It is ordinarily found desirable to provide for the frame to normally project three-eighths of an inch above the tread plate.

The operation of the device has already been indicated. When the tread plate is to be used to spot cure a tread repair on a non-skid tire, the space above the tread plate inside of the frame is filled with dry soapstone, or some similar material adapted to transmit heat. The portion of the tread surface of the tire casing to be repaired is then clamped on the tread plate, the soapstone entering into the space between the projecting portions of the non-skid design of the tread, forming a substantial support and heat transmitting medium therefor, and thus preserving the design. The necessary vulcanizing heat is applied in well known manner to the tread plate, usually from a flat steam plate, and the heat is transmitted directly and through the soapstone or other material to the portion of the casing undergoing repair.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. An apparatus of the character described, having in combination a vulcanizing plate and means supported on said vulcanizing plate adapted to provide a self-conforming supporting base for an object of irregular contour positioned above said vulcanizing plate.

2. An apparatus of the character described, having in combination a vulcanizing plate and means supported on said vulcanizing plate adapted to provide a heat transmitting self-conforming supporting base for an object of irregular contour positioned above said vulcanizing plate.

3. An apparatus of the character described, having in combination a vulcanizing plate and retractable means to position a layer of cushioning material over the surface of said plate.

4. An apparatus of the character described, having in combination a base, a vulcanizing plate provided thereon, a frame slidably engaged about said plate and resilient means for normally positioning the upper portion of said frame a slight distance above the upper surface of said plate.

5. An apparatus of the character described, having in combination a vulcanizing plate, a concave segmental top surface provided on said plate, a frame slidably engaged about the outer portion of said plate, a convex surface on said frame adapted to form a continuation of the segmental portion of said top surface when said frame is depressed to a position even with said surface, a plurality of extensions at the corners of said frame and tread plate, and means cooperating with said extensions for normally maintaining said frame elevated with respect to said tread plate.

6. An apparatus of the character described, comprising a base member provided with a tread plate section, a plurality of vertical studs at the corners of said base member, a frame slidably engaged over said tread plate section of said base member, a plurality of apertured members projecting from the corners of said frame and adapted to engage over the upper ends of said studs, resilient members interposed between projecting members of said base and frame, and means on said studs for limiting the upward movement of said frame.

7. An apparatus of the character described, comprising a base member provided with a tread plate section, a plurality of vertical studs at the corners of said base member, a frame slidably engaged over said tread plate section of said base member, a plurality of apertured members projecting from the corners of said frame and adapted to engage over the upper ends of said studs, coiled springs engaged over said respective studs between projecting members of said base and frame, and means on said studs for limiting the upward movement of said frame.

Signed by me this 25th day of August, 1926.

HERBERT K. WHEELOCK.